United States Patent [19]

Garlington et al.

[11] 4,163,956
[45] Aug. 7, 1979

[54] WOUND MULTI-CAPACITOR FILTER

[75] Inventors: Frank E. Garlington, Williamstown; Carl J. Famiano, Clarksburg, both of Mass.

[73] Assignee: Sprague Electric Company, North Adams, Mass.

[21] Appl. No.: 842,780

[22] Filed: Oct. 17, 1977

[51] Int. Cl.² .................... H03H 7/04; H03H 7/42; H01G 4/32; H01G 4/42
[52] U.S. Cl. .................................. 333/12; 333/25; 333/181; 333/184; 333/185; 361/303; 361/313
[58] Field of Search ............... 333/70 R, 70 S, 76, 333/79, 23, 12, 24 C, 25; 310/48, 51, 66, 72; 323/75 L, 75 P, 75 M, 75 S; 361/301, 271, 304–308, 310, 312, 313, 328–330

[56] References Cited

U.S. PATENT DOCUMENTS

| | | | |
|---|---|---|---|
| 1,840,776 | 1/1932 | Houck | 333/79 |
| 2,884,605 | 4/1959 | Dubilier | 333/23 X |
| 3,093,775 | 6/1963 | Lamphier | 361/330 |
| 3,106,671 | 10/1963 | Coleman et al. | 361/330 X |
| 3,508,128 | 4/1970 | Allison | 361/330 |
| 3,651,548 | 3/1972 | Behn | 29/25.42 |
| 3,739,245 | 6/1973 | Fuchshuber et al. | 361/306 X |

FOREIGN PATENT DOCUMENTS 449742  7/1936  United Kingdom .................. 333/79

Primary Examiner—Alfred E. Smith
Assistant Examiner—Marvin Nussbaum
Attorney, Agent, or Firm—Connolly and Hutz

[57] ABSTRACT

A wound multi-capacitor filter for suppressing R.F. interference signals on power lines is formed by winding into a roll a floating sheet electrode that is sandwiched between two dielectric layers, a pair of spaced equal area sheet electrodes and another electrode being in contact with the outer surfaces of the sandwiching dielectric layers. The pair of electrodes are connected to two power lines that deliver energy to a device such as a motor, while the other electrode is connected to a grounded terminal. This filter provides either a reduction in AC leakage or an improvement in noise attenuation or both compared to a conventional delta-connected filter.

12 Claims, 13 Drawing Figures

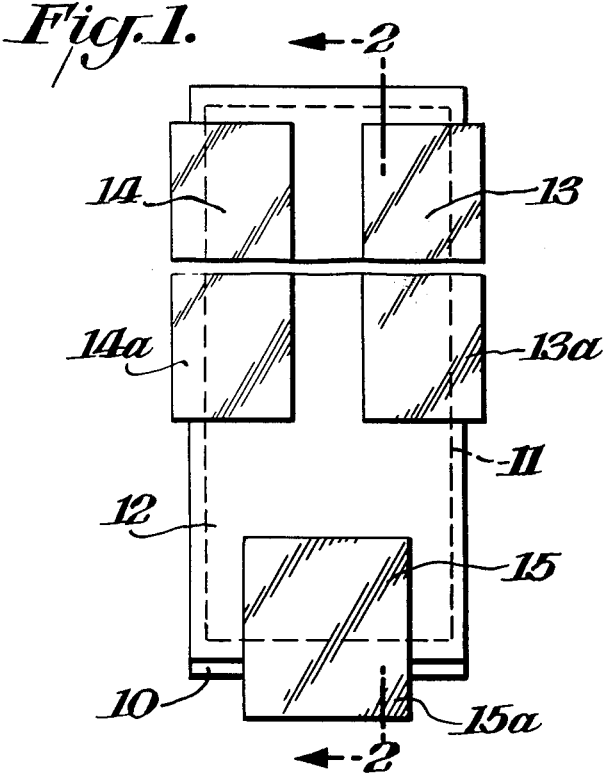
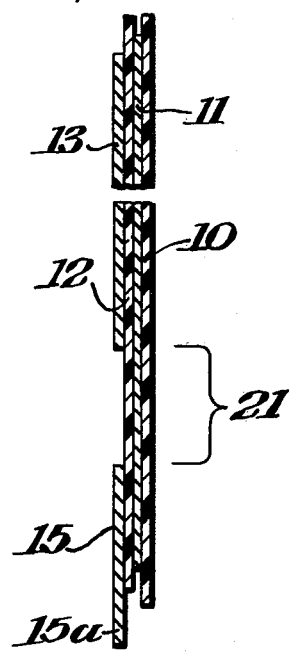
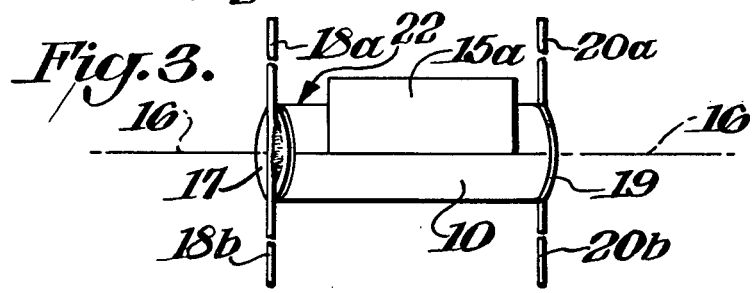
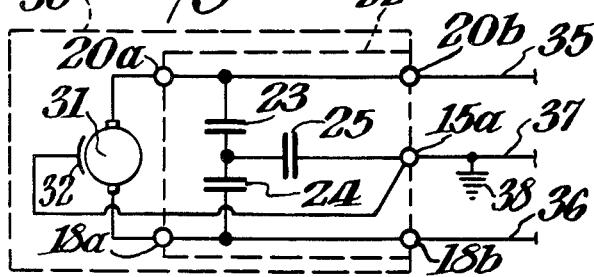
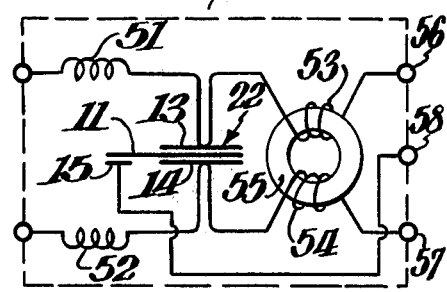
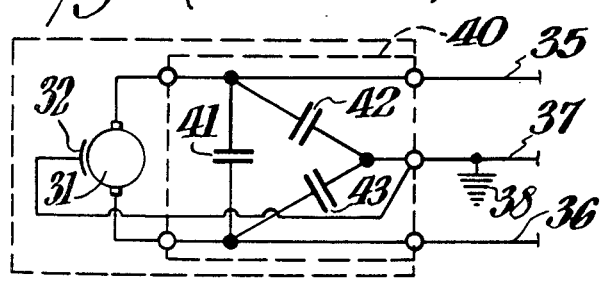

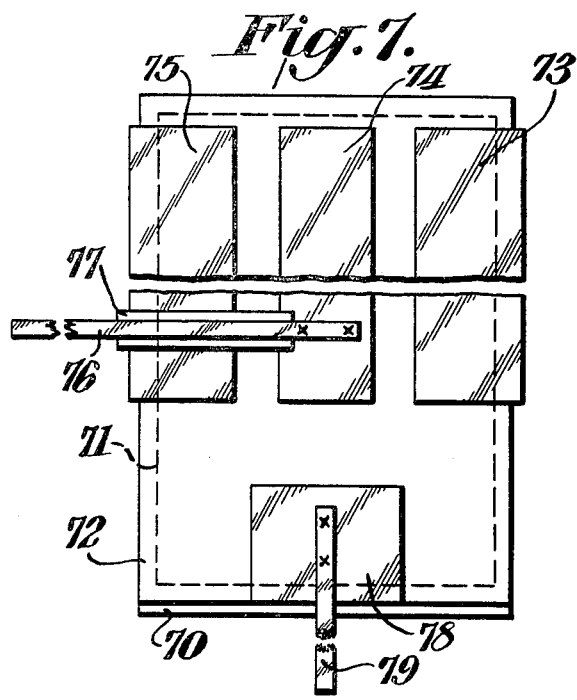
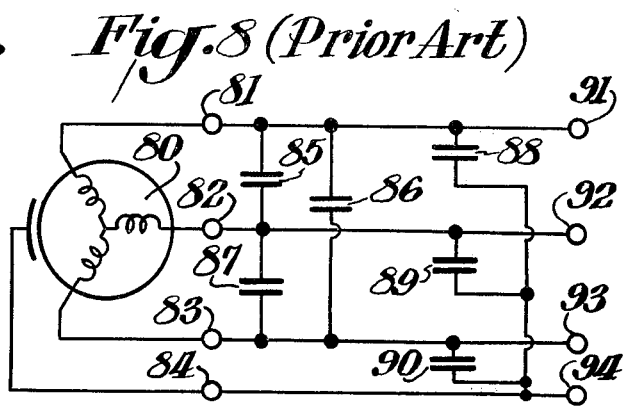
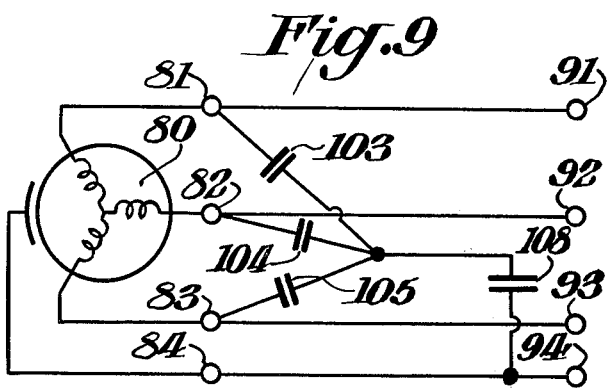
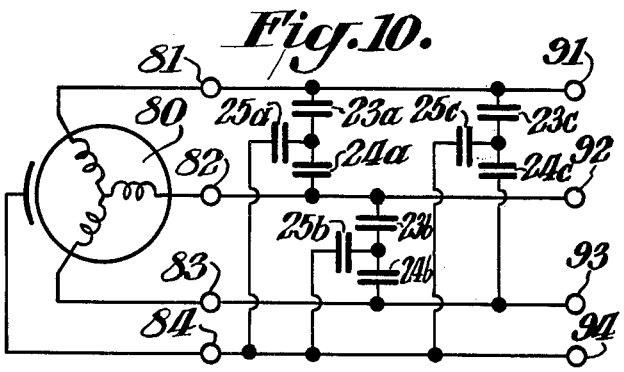
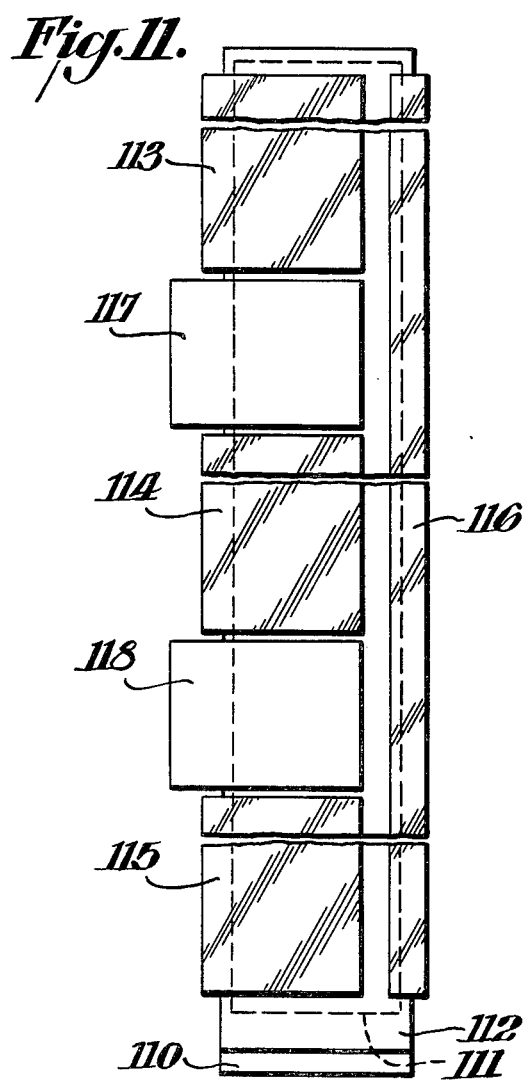
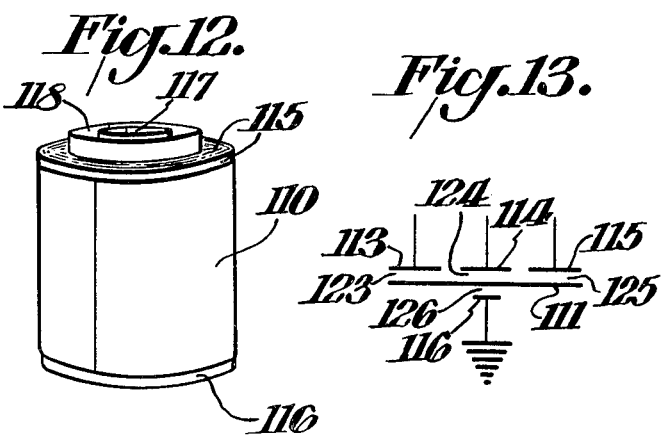

WOUND MULTI-CAPACITOR FILTER

BACKGROUND OF THE INVENTION

This invention relates to a wound multiple-capacitor filter for suppressing radio frequency (R. F.) signals on power lines.

Such filters are commonly used in association with electrically powered appliances which tend to generate noise signals that interfere with nearby radio and television reception. These filters normally include one capacitor connected across one phase of the power-lines to filter the "symmetrical" component of the noise signal, and are capacitor connected between each power-line to ground to filter the "common-mode" components of the noise signal. For a single phase line the filter usually has three capacitors in a delta (Δ) circuit configuration.

The incorporation of such filters to an electrical device or appliance causes an increased level of AC leakage current (of power-line frequency) to ground. Various standards limit the total AC leakage current contributed by both the device and the filter to no more than from 0.75 to 5 milliamperes (ma). Higher currents may prove lethal to personnel who may be touching the "grounded" housing of the device when the wire to earth ground is inadvertently opened. The AC leakage current attributable to the filter is about directly proportional to the capacity of one of the aforementioned line-to-ground capacitors, thus limiting the size of these capacitors that may be used. On the other hand the diverting of the common-mode noise signals from the power lines is enhanced by increasing the size of the line-to-ground capacitors.

The filter designer is faced with the additional consideration that a failure by shorting of a line-to-ground capacitor would pose a serious shock hazard. These capacitors which may operate under the full line-to-line voltage must therefore be of high quality and have a long expected life under these operating conditions. For example, the characteristic corona start voltage of the line-to-ground capacitors should be substantially greater than the line-to-line voltage to avoid early capacitor failure. These considerations lead to high costs in the production of line-to-ground filter capacitors.

It is therefore an object of this invention to provide a reliable, low cost interference filter having a high noise-rejection to AC-leakage-current ratio.

SUMMARY OF THE INVENTION

A wound multiple-capacitor filter for suppressing R.F. interference signals on power lines is comprised of a floating sheet electrode, two dielectric layers disposed over the opposite major faces of the floating electrode, respectively, and a pair of spaced electrodes being disposed against the dielectric layers. Each of the pair has substantially the same surface area in capacitive relationship with the floating electrode as the other. Another sheet electrode lies in contact with the dielectric layers and is spaced from the electrode pair. It has a surface area in capacitive relationship with the floating electrode that is from 0.2 to 0.001 times that of each electrode of the pair. Three lead means are provided for providing electrical access to each of the another electrode and the electrodes of the pair.

Yet another electrode may be included in the wound filter having the same area in capacitive relationship with the floating electrode as that of the electrodes of the pair.

The filter may be connected in an electrically operable apparatus to attenuate electromagnetic interference (EMI) that is generated by the electrical motor or other load device of the apparatus, and substantially prevent such interference signals from appearing on the power lines. For this purpose, the pair of electrodes are connected to two power line terminals through which electrical power may be delivered to the device, and the another electrode is connected to an earth ground terminal. The filter itself may additionally include inductors and/or a balun-type transformer to further attenuate the EMI signals. This can result in a filter circuit configuration resembling a "T".

This invention recognizes the principles (a) that the characteristic corona start voltage of a capacitor is chiefly a function of construction features such as electrode spacings, dielectric material types, and the geometry of lead means, but is not a strong function of dielectric thickness or of the extent of an electrode area that is in capacitive relationship with another electrode; (b) that the voltage across each of the capacitors of a T-connected capacitor filter (as in this invention) will be about half the line to line voltage, while the capacitors of a standard delta-connected filter will be subject to the full line voltage; and (c) that a filter having T-connected capacitors as in the filter of this invention compared to a prior art delta-connected filter that will introduce the same amount of unwanted AC leakage current into the circuit, will advantageously provide up to 6 db more attenuation of EMI signals.

From another viewpoint, a T-connected filter of this invention providing the same EMI attenuation as a standard filter, will be expected to introduce half the amount of unwanted AC leakage current and still provide the more certainly corona-free operation and longer life in service. Further, the wound multiple-capacitor filter structure of this invention is capable of a high degree of automation in production and may be produced at low cost.

BRIEF DESCRIPTION OF THE DRAWING

FIG. 1 shows a wound filter of this invention having been unrolled (vertically as shown).

FIG. 2 shows a side sectional view of the unrolled filter of FIG. 1 taken in section 2—2.

FIG. 3 shows in perspective view the wound filter of FIGS. 1 and 2 with two lead wires attached.

FIG. 4 shows a schematic diagram of a filter of this invention being connected to an electric motor exemplifying an electrical load that tends to generate EMI signals.

FIG. 5 shows a schematic diagram of a filter of the prior art connected to an electric motor.

FIG. 6 shows a filter of this invention in schematic form including a wound multiple-capacitor filter component such as that of FIG. 3 in combination with additional filter components.

FIG. 7 shows another wound filter of this invention having been unrolled (vertically as shown) for use on a three phase power line.

FIG. 8 shows a schematic of a filter of the prior art being conneced to a three phase motor.

FIG. 9 shows a schematic diagram of a three phase filter of this invention such as that of FIG. 7 being connected to a three phase motor.

FIG. 10 shows a schematic diagram of three filters of this invention of the type illustrated in FIGS. 1-3 being connected to a three phase motor.

FIG. 11 shows another three phase filter of this invention having been unrolled (vertically as shown).

FIG. 12 shows in perspective view the wound filter of FIG. 11.

FIG. 13 shows a schematic representation of the wound filter of FIG. 12 wherein the functional relationships between the electrodes are made explicit.

DESCRIPTION OF THE PREFERRED EMBODIMENTS

A preferred embodiment of a wound multiple-capacitor filter for suppressing R.F. interference signals on a two-phase power line is illustrated in FIGS. 1, 2 and 3. A strip 10 of MYLAR (a trade name of E.I.du Pont de Nemours for the plastic polyethyleneterephthalate) serves as a first dielectric layer. Overlying the layer 10 is an aluminum foil 11, that serves as a floating electrode, having lateral dimensions that are less in all directions than those of layer 10. Another dielectric layer of MYLAR 12 (having essentially the same lateral dimensions as those of layer 10) is registered over the aluminum electrode 11. Over the MYLAR layer 12 there is disposed a pair of spaced foil electrodes 13 and 14, each of which has a width that is approximately half that of the floating electrode 11. Each electrode of the pair extends beyond opposite edges of the dielectric layers 10 and 12 as well as of the floating electrode 11.

Another electrode 15 is disposed over another region of the dielectric layer 12. Electrode 15 extends outwardly in a longitudinal direction (the winding direction which is perpendicular to the axis 16 of the wound body) to beyond the ends of the dielectric layers 10 and 12 and floating electrode 11. This outwardly extending portion 15a of electrode 15 serves as a means for providing electrical access in the wound capacitor of FIG. 3 to the other portion of electrode 15, the surface area of which is in capacitive relationship with the floating electrode.

The wound filter 22 of FIG. 3 additionally shows a termination coating 17 of solder that contacts the extending foil portion 14a and provides a means for solder attaching lead wire 18. At the opposite end of the wound filter body another solder termination 19 contacts the extended foil portion 13a and provides a means for attaching lead wire 20.

It is preferred that the space 21 between the pair of electrodes 13 and 14 and the electrode 15 be long enough to extend at least one full winding turn in the wound filter of FIG. 3. This insures a minimum direct capacitive relationship between electrode 15 and the pair of electrodes 13 and 14, the floating electrode 11 being interposed at least once therebetween. It will be more fully appreciated from the following discussion that this preferred structure avoids the possibility that only a single dielectric layer may separate a portion of electrode 15 and the pair of electrodes 13 and 14 and thus insures that no portion of either dielectric layers 10 and 12 experience a greater voltage stress than one half the power line voltage from line to line under any conditions.

In FIG. 4 the filter 22 is schematically represented wherein the capacitors 23, 24 and 25 correspond to those formed by the floating electrode 11 and electrodes 13, 14 and 15, respectively. The components shown within dotted line 30 represent an electric appliance including an electric motor 31 and the filter 22. The motor has a metal case 32 that is connected to the terminal 15a.

The appliance 30 derives electrical energy through terminals 20b and 18b from single phase AC power lines 35 and 36, respectively. A conventional third wire 37 is connected between earth ground 38 and terminal 15a.

A wound filter, having the same structure as that of FIGS. 1-3, was constructed. The dielectric layers are of 1⅜ inch (33.6 mm) MYLAR having a thickness of 0.00032 inch (0.0081 mm). The electrodes are strips of aluminum foil having a thickness of 0.00025 inch (0.0061 mm). The width of the foil electrode 11 is 1 13/16 inch (44.8 mm) and the width of electrodes 13, 14 and 15 is ⅝ inch (15.2 mm). The lengths of electrodes 13 and 14 is 118 inches (288 cm) and the space 21 is 5 inches (1.2 cm). The filter was wound on a 1/32 inch (0.0078 mm) mandrel and aluminum solder was applied by a hot iron to form the termination coatings 17 and 19. Capacitors 23, 24 and 25 have capacity values of 0.2, 0.2 and 0.0041 microfarads, respectively.

The filter was connected between a 125 volt 60 Hz power-line and a standard "quarter-inch" hand drill following the schematic of FIG. 4. With the drill turned on, the RF voltage was measured from each power-line (35 and 36) to ground line (37) at selected frequencies from 0.15 to 30 MHz across a 150 ohm resistor in accordance with a standard electromagnetic interference (EMI) test method, namely that described in Comité International Spécial des Perturbations Radioélectriques (C.I.S.P.R.) publication #14, 1975. The filter was then removed, the drill was connected directly to the power lines and the measurement was repeated. The data obtained is presented in Table I, the EMI voltage being given in decibels (db).

Table I

| freq. (MHz) | EMI from line to ground in db | | | | | |
|---|---|---|---|---|---|---|
| | without filter | | Filter 22 | | Filter 40 | |
| | line 35 | line 36 | line 35 | line 36 | line 35 | line 36 |
| 0.15 | 91 | 91 | 75 | 75 | 77 | 78 |
| 0.30 | 82 | 82 | 71 | 71 | 75 | 75 |
| 0.60 | 70 | 70 | 63 | 63 | 66 | 66 |
| 1.0 | 73 | 73 | 63 | 63 | 65 | 65 |
| 3.0 | 71 | 71 | 51 | 51 | 56 | 56 |
| 6.0 | 73 | 72 | 48 | 48 | 52 | 52 |
| 10.0 | 68 | 72 | 46 | 46 | 52 | 52 |
| 20.0 | 69 | 67 | 47 | 47 | 56 | 56 |
| 30.0 | 65 | 66 | 44 | 44 | 47 | 47 |

In general the ratio of the capacity of capacitor 25 to that of capacitor 23 (or 24) is chosen to be no less than 0.001 to insure adequate filtering of the "common mode" EMI signal and no more than 0.2 to avoid introducing excessive AC leakage current. Thus it is preferred in a wound multiple-capacitor filter of this invention that the electrode to be connected to ground (e.g. electrode 15) would have a surface area in capacitive relationship with the floating electrode that is from 0.001 to 0.2 times that of one electrode of the pair.

A filter network 40 of the prior art made of discrete capacitors 41, 42 and 43 is illustrated in FIG. 5. Capacitor 41 is of a wound foil and MYLAR construction having a capacity of 0.1 microfarads so that the line to line capacity provided in both filters 22 and 40 is 0.1 microfarads. The wound foil-MYLAR capacitors 42 and 43 each have a capacity of 0.0021 microfards so that the total lines to ground capacity of both filters is also essentially the same, namely 0.0041 microfarads.

Magnitudes of the EMI signals generated by the same drill that were measured on the power lines side of this prior art filter 40 are shown for comparison in Table I. It is seen that the filter 22 of this invention effects a 16 db and a 21 db reduction in the EMI signal transmitted by the motor to the power lines at the low 0.15 MHz and at the high 30 MHz frequencies, respectively. This is better by about 2 db than for the prior art filter 40. At 10.0 MHz, the improved filter action of the filter 22 is seen to amount to 6 db.

Comparative measurements were also made of the AC leakage current for the two filters 22 and 40. These measurements were conducted in accordance with the standard method described in paragraph 16.2, Publication 335-1 (1970) of the International Electro-technical Commission (IEC).

The leakage currents at the two power-lines attributed to filter 22 were 0.111 milliamperes (ma) and 0.121 ma, respectively, while the corresponding leakage currents for filter 40 was 0.125 ma and 0.117 ma. These values are close to those obtained by dividing half the line to line voltage (120v) that appears across capacitor 25 by the capacitive reactance at 60 Hz of a 0.004 microfarad capacitor, confirming a simple circuit analysis. Likewise they are near the value obtained by dividing the full line to line voltage by the capacitive reactance of one of the capacitors 42 or 43, since each of these grounded capacitors has impressed upon it the full line voltage.

If it is assumed that the filter capacitors of the present invention are of essentially the same construction as the capacitors in a conventional filter, namely that the same materials are employed for the dielectric layers, the margins between electrode and dielectric edges are the same, the lead means are essentially the same (or do not contribute to the corona start voltage of the capacitor at all), etc., then the corona start voltage of all of the capacitors would be expected to exhibit substantially the same corona start voltage.

In the filter of this invention each of the capacitors has impressed upon it only about half of the line to line voltage while in the prior art filter the full line to line voltage may appear across all three capacitors (considering that one of the two main power lines is normally at about ground line potential). Thus, under the above assumption of similar constructions, filter capacitors of the present invention operate at a voltage much less than their characteristic corona start voltage compared with filter capacitors in a prior art filter in service on the same power-line. It follows that a filter of the present invention will have a longer service life and offer a greater degree of personnel safety.

When it is desired to achieve a greater attenuation of EMI signals than is provided by a three-capacitor filter, other components may be added as illustrated in FIG. 6. Here the multiple-capacitor filter 22 is represented by a self-explanatory symbol wherein the electrodes 11, 13, 14 and 15 are explicitly shown. Inductors 51 and 52 are added in series with the two main power lines to further attenuate "symmetrical" EMI signals. Also a balum type transformer having two equal turn windings 53 and 54 on a high permittivity magnetic core 55 is added to further attenuate the "common mode" EMI signal. Ends of the two windings having the same winding polarity on the core are connected to the two power line terminals 56 and 57, respectively, while the other two ends are connected to the two inductors respectively. Electrode 15 is connected to ground terminal 58.

The main features of a four-capacitor filter of this invention are illustrated in FIG. 7. A floating foil electrode 71 (shown outlined by a dotted line) is registered over a larger strip of MYLAR 70 so that the edges of the strip 70 extend beyond the edges of electrode 71. Another MYLAR strip 72 having the same width as strip 70 overlies the electrode 71. Three spaced foil electrodes 73, 74 and 75 are disposed over the dielectric layer 72. Electrodes 73, 74 and 75 have essentially the same surface area in capacitive relationship with the floating foil 71. Electrical access to foil 74 is achieved by a standard stitch attachment of a metal tab 76 thereto. Tab 76 extends outwardly in an axial direction from the wound body and is insulated from electrode 75 by a MYLAR strip 77. Another electrode 78 is disposed over another region of the dielectric layer 72. Electrical access to this electrode 78 is provided by metal tab 79 that extends centrally from the wound body (not shown) in a direction perpendicular to the axis of the wound body. This filter is suitable for use with a three-phase apparatus.

A prior art filter for three-phase application is illustrated in FIG. 8 wherein a three-phase motor 80 has power terminals 81, 82 and 83 and a ground terminal 84. The conventional filter consists of three line to line capacitors 85, 86 and 87 and three line to ground capacitors 88, 89 and 90. The filter is interposed between the motor and the three-phase power lines that are brought in on power terminals 91, 92 and 93.

Terminal 94 is intended to be connected to earth ground. In FIG. 9 the same motor 80 is connected to the same three-phase power lines 91, 92 and 93 through a filter of the type described above that is illustrated in FIG. 7. This filter is made up of four capacitors 103, 104, 105 and 108 which correspond to the electrodes 73, 74, 75 and 78, respectively, of FIG. 7.

In FIG. 10 the same motor 80 is again shown connected to the three-phase power lines 91, 92 and 93 through a filter system consisting of three separate wound multiple-capacitor filters such as that described in relation to FIGS. 1 through 3 above. The wound three-capacitor filters that are connected across each of the three phases have capacitors that correspond to those of FIG. 4 and are designated by the same numerals employed in FIG. 4 with added subscripts a, b and c. Each subscript corresponds to one of the three phases.

A third embodiment of a wound multiple-capacitor filter of this invention, illustrated in FIG. 11, includes a dielectric layer 110, a floating foil electrode 111 and a second dielectric layer 112 positioned so that the foil 111 is sandwiched between layers 110 and 112. Three substantially equal area foil electrodes 113, 114 and 115 are spaced from each other and overlie the layer 112 (and are in contact with both layers 110 and 112 in the wound body of FIG. 12), each extending beyond one edge of the floating electrode 111 and beyond the corresponding edges of the layers 110 and 112.

Another electrode 116 also overlies layer 112 and extends beyond the opposite edges of the foil 111 and layers 110 and 112. The symbol of FIG. 13 represents this wound capacitor wherein the capacitor 126 has a capacitance that is from 0.2 to 0.001 times the capacitance of each of substantial equal capacitors 113, 114 and 115.

The adjacent of the electrodes 113, 114 and 115 have in the space therebetween a layer of dielectric material 117 and 118 that extend in the same direction but further than the extending portions of electrodes 113, 114 and 115. After winding, these extending layers 117 and 118 serve as barriers between the extending termination (or lead attachment) regions of foils 113, 114 and 115, so that shorting the adjacent of the electrodes during lead attachment steps will be avoided. This construction has the advantage that all electrode terminations may be made at the ends of the wound body whereby standard solder wiping or metal spray techniques may be used that tend to provide strong low impedance connections. It will be appreciated that by omitting electrode 115, and optionally layer 118, a filter suitable for only single phase power line applications will be provided having the above noted advantageous termination features.

It is also notable that some or all of the electrodes of the above described wound multi-capacity filters may be of the standard vacuum metallized type with minor modifications that may be readily effected by those knowledgeable in the filter art.

Wound filters of this invention may also employ other dielectric layer materials such as polypropylene, paper and combinations of different materials. Other electrode materials such as lead-tin alloy foils and metallized zinc films may be used. The wound filters may also be impregnated by a dielectric oil or by a gaseous or liquid fluorocarbon.

What is claimed is:

1. A wound multiple-capacitor filter for suppressing R.F. interference signals on power lines comprising:
   (a) a floating sheet electrode;
   (b) two dielectric layers being disposed over the two major faces of said floating electrode respectively;
   (c) a pair of spaced sheet electrodes being disposed against said layers, each of said pair having substantially the same surface area in capacitive relationship with said floating electrode as the other, said pair of electrodes extending axially beyond the opposite edges of said floating electrode, respectively;
   (d) another sheet electrode lying in contact with said layers, being spaced from said pair and having a surface area in capacitive relationship with said floating electrode that is from 0.2 to 0.001 times that of each of said pair, an outer turns portion of said floating electrode extending beyond the ends of said pair, said surface area of said another electrode having said capacitive relationship with the end region of said outer turns portion; and
   (e) first, second, and third electrical access means for providing electrical access to each of said another and said pair of spaced electrodes, respectively.

2. The filter of claim 1 wherein the portion of said floating electrode that lies between said ends of said pair and said end region extends at least one complete turn within said wound filter.

3. The filter of claim 1 wherein said first electrical access means comprises a metal tab that is attached within said wound filter to said another electrode, said tab extending centrally from the wound body of said filter in a direction substantially perpendicular to the axis of said wound body.

4. The filter of claim 1 wherein said pair of electrodes consist of metal foils said second and third electrical access means comprising two lead wires being connected to the axially extending portions of said pair, respectively.

5. The filter of claim 1 additionally comprising first and second power-line terminals and first and second load terminals, said second and third electrical access means being connected to said first and second power-line terminals, respectively; an inductor being connected between said first power-line and first load terminals; and another inductor being connected between said second power-line and second load terminals.

6. The filter of claim 1 additionally comprising first and second power-line terminals and first and second load terminals, said second and third electrical access means being connected to said first and second load terminals, respectively; and a balun-type transformer having two equal windings and a high permittivity core, the ends of said two windings which ends have the same winding polarity on said core being connected to said first and said power-line terminals, respectively, the other ends of said windings being connected to said first and said second load terminals, respectively.

7. The filter of claim 1 wherein said first electrical access means comprises a portion of said another electrode extending beyond the outer ends of said dielectric layers in a perpendicular direction to the axis of said wound filter.

8. The filter of claim 1 wherein said second and third electrical access means comprises portions of said pair of sheet electrodes extending, respectively, in opposite axial directions with respect to said wound filter beyond the edges of said dielectric layers.

9. A wound multiple capacitor filter for suppressing R.F. interference signals on power lines comprising:
   (a) a floating sheet electrode;
   (b) two dielectric layers being disposed over the two major faces of said floating electrode respectively;
   (c) a pair of spaced sheet electrodes being disposed against said layers, each of said pair having substantially the same surface area in capacitive relationship with said floating electrode as the others, said pair of electrodes extending in one axial direction beyond one edge of said floating electrode, the space between said spaced electrodes of said pair having been effected in the direction of winding of said filter;
   (d) another sheet electrode lying in contact with said layers, being spaced from said pair and having a surface area in capacitive relationship with said floating electrode that is from 0.2 to 0.001 times that of each of said pair, said another electrode extending in the opposite axial direction beyond the opposite edge of said floating electrode; and
   (e) first, second, and third electrical access means for providing electrical access to each of said another and said pair of spaced electrodes, respectively.

10. The filter of claim 9 additionally comprising another dielectric layer lying in said space and extending further than and in the same direction as said extending pair.

11. The filter of claim 9 additionally comprising yet another electrode having substantially the same area in capacitive relationship with said floating electrode as one of said electrodes of said pair, said yet another electrode also extending beyond said one edge and being spaced from the adjacent of said electrodes of said pair; and a fourth electrical access means for providing electrical access to said yet another electrode.

12. An electrically operable apparatus comprising an electrical device having two power-line terminals and a ground terminal; and a wound multiple-capacitor filter for suppressing R.F. interference signals comprising:
   (a) a floating sheet electrode;

(b) two dielectric layers being disposed over the two major surfaces of said floating electrode, respectively;
(c) a pair of spaced sheet electrodes being disposed against said layers, each of said pair having substantially the same surface area in capacitive relationship with said floating electrode as the other;
(d) another sheet electrode lying in contact with said layers, being spaced from said pair and having a surface area in capacitive relationship with said floating electrode that is from 0.2 to 0.001 times that of each of said pair; and
(e) first, second and third leads being connected to each of said another and said pair of spaced electrodes, respectively, said first lead being connected to said ground terminal and said second and third leads being connected to said power-line terminals, respectively.

* * * * *